US009796563B2

(12) United States Patent
Rintanen

(10) Patent No.: US 9,796,563 B2
(45) Date of Patent: Oct. 24, 2017

(54) LOAD HANDLING BY LOAD HANDLING DEVICE

(71) Applicant: KONECRANES GLOBAL CORPORATION, Hyvinkää (FI)

(72) Inventor: Kari Rintanen, Espoo (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 141 days.

(21) Appl. No.: 14/432,716

(22) PCT Filed: Oct. 2, 2013

(86) PCT No.: PCT/FI2013/050955
§ 371 (c)(1),
(2) Date: Mar. 31, 2015

(87) PCT Pub. No.: WO2014/053703
PCT Pub. Date: Apr. 10, 2014

(65) Prior Publication Data
US 2015/0291400 A1 Oct. 15, 2015

(30) Foreign Application Priority Data

Oct. 2, 2012 (FI) .................................. 20126027

(51) Int. Cl.
G06F 7/00 (2006.01)
B66C 13/46 (2006.01)
B66C 13/00 (2006.01)
G06T 7/593 (2017.01)
G01S 17/87 (2006.01)
G01S 17/89 (2006.01)

(52) U.S. Cl.
CPC .............. *B66C 13/46* (2013.01); *B66C 13/00* (2013.01); *G06T 7/593* (2017.01); *G01S 17/87* (2013.01); *G01S 17/89* (2013.01); *G06T 2207/10028* (2013.01)

(58) Field of Classification Search
USPC ......................................................... 700/214
See application file for complete search history.

(56) References Cited

U.S. PATENT DOCUMENTS 5,729,453 A * 3/1998 Lee .......................... B66C 13/46
212/275
5,780,826 A * 7/1998 Hareyama ............. B66C 19/007
180/167
6,124,932 A * 9/2000 Tax .......................... B66C 13/46
212/285

(Continued)

FOREIGN PATENT DOCUMENTS

CN 1338421 A 3/2002
CN 1394190 A 1/2003
(Continued)

*Primary Examiner* — Kyle Logan
(74) *Attorney, Agent, or Firm* — Birch, Stewart, Kolasch & Birch, LLP

(57) ABSTRACT

A load is handled by a load handling device comprising gripping means for gripping at least one fastening point of the load, comprising determining, in the gripping means, a distance map within the area of which are described a part of the area of the load to which the gripping means attach and/or on which another load is stacked, as well as surroundings of the load.

28 Claims, 7 Drawing Sheets

(56) References Cited

U.S. PATENT DOCUMENTS

| | | | |
|---|---|---|---|
| 6,648,156 B1 | 11/2003 | Bryfors et al. | |
| 7,106,883 B2 | 9/2006 | Uchida et al. | |
| 8,452,527 B2* | 5/2013 | Tan | B63B 25/004 |
| | | | 414/140.3 |
| 8,575,946 B2* | 11/2013 | Kato | B66C 13/46 |
| | | | 324/642 |
| 9,150,389 B2* | 10/2015 | Rintanen | B66C 13/46 |
| 2002/0024598 A1 | 2/2002 | Kunimitsu et al. | |
| 2002/0191813 A1 | 12/2002 | Uchida et al. | |

FOREIGN PATENT DOCUMENTS

| | | |
|---|---|---|
| CN | 102336365 A | 2/2012 |
| DE | 102008019373 A1 | 1/2009 |
| EP | 1 894 881 A2 | 3/2008 |
| JP | 2001-97670 A | 4/2001 |
| JP | 2001-220087 A | 8/2001 |
| JP | 2002-241078 A | 8/2002 |
| JP | 2005-263373 A | 9/2005 |
| JP | 2006-256848 A | 9/2006 |
| JP | 2006-273532 A | 10/2006 |
| RU | 111 532 U1 | 12/2011 |
| WO | WO 03/016194 A1 | 2/2003 |

* cited by examiner

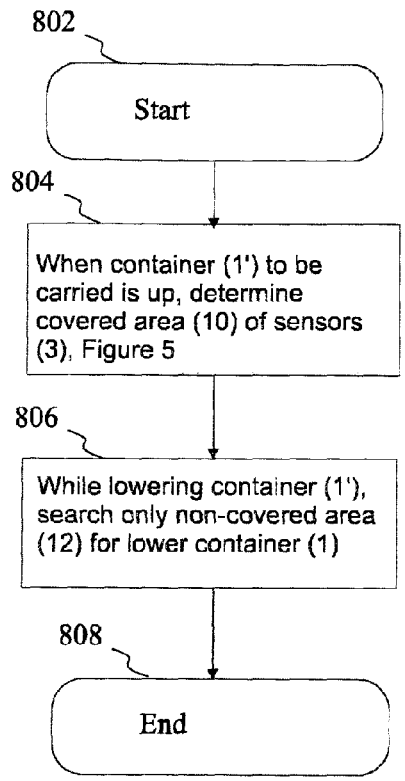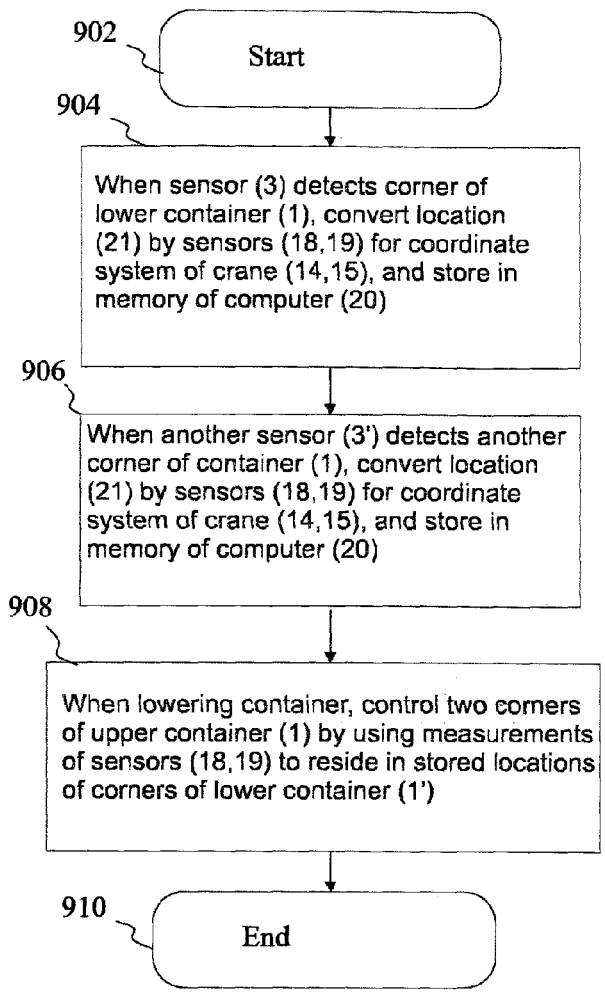
Figure 8
Figure 9
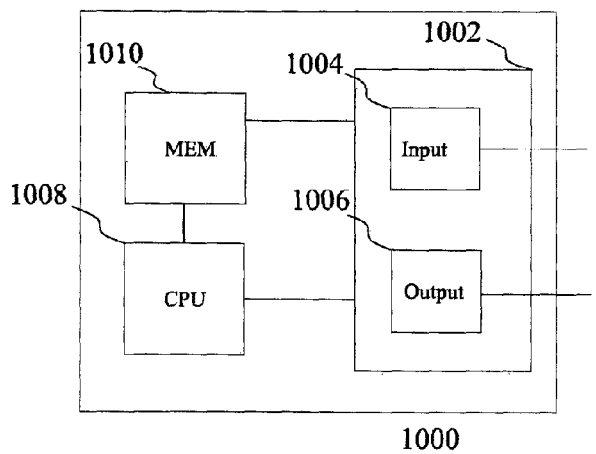
Figure 10

LOAD HANDLING BY LOAD HANDLING DEVICE

BACKGROUND OF THE INVENTION

The invention relates to load handling by a gripper, and particularly to load handling by gripping means that attach to one or more load fastening points.

Today, a vast majority of international sea freight is transported in containers. Such containers are boxlike transport units having standard dimensions, either 20, 40 or 45 feet in length. A container is about 2.5 m in width, and most typical container heights are about 2.6 m and 2.9 m.

The containers are provided with standardized corner castings enabling a container to be hoisted and carried by different container hoists. A container hoist is typically provided with a spreader suspended on hoisting ropes or chains, the spreader being adjusted by a telescopic mechanism according to the length of a container to be picked up, e.g. to a length of 20 or 40 feet. The corners of a spreader are provided with special turnable twist-locks enabling a container to be gripped. The corner castings of the container are provided with standardly shaped holes in which the twist-locks of the spreader are fitted. When the container hoist lowers the spreader on top of a container such that all four twist-locks of the spreader are received in the holes of the corner castings, the twist-locks may subsequently be turned by 90 degrees, making the twist-locks lock into the corner castings. The container may now be lifted into the air, suspending from the spreader.

The containers may be stacked on top of one another, typically e.g. five containers on top of each other. This enables a large number of containers to be stored within a small ground area, e.g. in a container port. The stacking of the containers has to be carried out carefully, such that the corner castings in the bottom of a container to be stacked are aligned with the corner castings provided in the roof of a lower container with an accuracy of at least about 5 cm. Otherwise there is a risk of the container stack collapsing.

A typical container hoist used for picking up and stacking containers is called a gantry crane, FIG. 1, which may move either on rails (Rail Mounted Gantry Crane or RMG) or on rubber tyres (Rubber Tyred Gantry Crane or RTG). When using a gantry crane, the containers (1) to be stored are placed in rows (a, b, c, d, e) between the legs of the gantry crane (14) such that typically 6 to 8 rows of containers are provided side by side between the legs of the gantry crane, the rows typically comprising e.g. five containers stacked on top of one another. A gap of typically 30 to 50 cm is then left between the containers and the container rows in order to make the containers easier to handle. Typically, a driveway (f) is left between the legs of the gantry crane to enable containers to be driven underneath the gantry crane to be stacked into rows (a, b, c, d, e).

In the gantry crane, the spreader (2) is by means of hosting ropes (16) suspended on a special trolley (15), which may be driven in a sideways direction of the container hoist into different positions, thus enabling containers in different rows to be handled. The length of the container rows may be up to hundreds of meters, i.e. several dozens of 20 or 40 feet containers in succession. A ship-to-shore crane is particularly designed for lifting containers to and from a ship. In such a case, the trolley of the crane is also capable of moving along a cantilever-like bridge so as to reside on top of a ship being handled.

Another typical container hoist is called a straddle carrier, which moves on rubber tyres and is considerably narrower than the gantry crane. The straddle container may accommodate only one row of containers, having typically 3 to 4 containers stacked on top of one another, between its legs. Now, a considerably larger gap, up to 1.5 m, is left between the container rows in order to provide enough space for the tyres of the straddle carrier to move between the container rows.

The spreader (2) of the container hoist is often also provided with a special fine transfer mechanism, in which case e.g. by means of stay ropes (17) of the suspension of the spreader or by means of different hydraulic cylinders it is possible to control the horizontal position and skew of the spreader without having to drive or move the trolley (15) or the container hoist (14) in its entirety. This property aims at making the containers easier and faster to pick up and stack on top of one another.

If the fine transfer mechanism of the spreader is implemented e.g. by stay ropes (17), the number thereof typically being four, i.e. one for every corner the container (FIG. 7), a desired force or difference of forces is then e.g. by electric motors generated in the stay ropes so as to move the spreader (2) horizontally (x, y) in a desired direction or to skew the spreader in a desired direction. The fine transfer mechanism of the straddle carrier is usually implemented by different hydraulic cylinders.

When a container handling machine, such as the aforementioned container hoists, is used for handling containers, high accuracy is required of a driver in several work phases. Examples of such work phases comprise gripping a container and stacking a container on top of another container.

In order to pick up a container, the spreader has to be controlled horizontally so as to accurately reside on top of the container to be picked up, either by using a fine transfer mechanism or by moving the trolley or the container hoist in its entirety such that when the spreader is lowered on top of the container, all four twist-locks of the spreader are accurately received in the holes of the corner castings of the container. The work phase is laborious for the driver of the container handling machine. In some cases, the picking up process is facilitated by mechanical guides mounted in the spreader. However, the guides make working in the narrow gaps between the containers more difficult.

In order to stack a container on top of another container, the spreader and the container suspending therefrom have to be accurately controlled so as to reside on top of a lower container, either by using a fine transfer mechanism or by moving the trolley or the container hoist in its entirety such that when an upper container is lowered all the way to the lower container, the corner castings in the bottom of the upper container align with the corner castings of the lower container as accurately as possible. A stacking accuracy to strive at is typically about 3 cm. As is understood by one skilled in the art, this work phase requires more time and accuracy of the driver of the container handling machine than picking up a container since now the alignment of the container on top of a lower container cannot be facilitated e.g. by simple mechanical guides, such as those mentioned above.

The operation of container hoists is becoming more and more automated such that the work of the driver of a container hoist is made faster and easier by means of computer control, for instance. When automation is taken further, it is possible to even eliminate the driver from the container handling machine, in which case the container handling machine operates either by remote control and/or completely independently, controlled by a computer. It is often also possible to perform work phases in a flexible manner such that if in some case an automatic work phase fails, a remote-control operator may then carry out the work phase exceptionally by remote control. For instance in such a situation it would be advantageous that the technology used could flexibly adapt to be both a function assisting the driver and an automatic function controlled by a computer.

A previously known solution to assist the driver in gripping a container utilizes Charge-Coupled Device or CCD cameras installed in a spreader and oriented downwards for transmitting video footage enabling the driver to align the spreader on top of a container. However, the method is not suitable for automating the operation since image processing algorithms that could enable the location of a container to be monitored from camera footage function unreliably in different weather and lighting conditions. The method is not suitable for stacking containers, either, since while stacking containers, a camera sensor is located quite far away from a lower container (3 m) and, in addition, an upper container blocks the driver's view either for the most part or completely. Furthermore, the upper container casts a shadow on the lower container, making the gap between the containers very dark. In such a case, it is very difficult to discern the lower container in the video footage.

BRIEF DESCRIPTION OF THE INVENTION

It is thus an object of the invention to provide a method and an apparatus implementing the method so as to enable the aforementioned problems to be solved. The object of the invention is achieved by a method, an arrangement, and a computer program product which are characterized by what is stated in the independent claims. Preferred embodiments of the invention are disclosed in the dependent claims.

According to an aspect, a method is provided for handling a load by a load handling device comprising gripping means for gripping at least one fastening point of the load, the method comprising determining, in the gripping means, a distance map within the area of which are described a part of the area of the load to which the gripping means attach and/or on which another load is stacked, as well as surroundings of the load.

According to another aspect, an arrangement is provided comprising means for carrying out a method according to any aspect.

According to another aspect, a computer program product is provided comprising program instructions to make a device, e.g. a load handling device, execute a method according to any aspect when downloaded into the device.

According to another aspect, a method is provided for updating a load handling device, wherein an arrangement according to an aspect or a computer program product according to an aspect is installed on the load handling device. The invention is based on the idea of forming a distance map of a part of the load to be handled to which attachment is made or on top of which another load is stacked. The distance map determines a plurality of map points having a distance value. Preferably, a distance comprises a distance in one direction of movement of the load, e.g. in a vertical direction, enabling the load to be controlled on the basis of the distance map, e.g. in the vertical direction, and/or in other directions of movement which may be perpendicular to the vertical direction. Further, the distance map may determine an area of a load to be carried, enabling the load to be carried to be moved by monitoring an area of the distance map outside the load to be carried.

An advantage of the method and arrangement according to the invention is that it is possible to monitor relevant parts of the load to be handled accurately. In addition, the monitoring may easily and flexibly be carried out either by a person or a computer. When the area to be monitored is limited only to a part of the load to be handled, processing of monitoring information may be kept simple, in which case the amount of monitoring errors may also be kept small. Further advantages and/or benefits are disclosed in the following description, in which different embodiments are described in closer detail.

BRIEF DESCRIPTION OF THE FIGURES

The invention is now described in closer detail in connection with preferred embodiments and with reference to the accompanying drawings, in which

FIG. 8 shows a method of stacking a load, according to an embodiment;

FIG. 9 shows a method of handling a load when the load is controlled on the basis of a distance map measured in a coordinate system of a crane and in a coordinate system of a spreader, according to an embodiment; and FIG. 10 shows a device for implementing arrangements of the present embodiments.

DETAILED DESCRIPTION OF THE INVENTION

An embodiment is based on determining a distance map. The distance map comprises a plurality of location points in a two-dimensional (2D) plane, and distance information associated with the location points. The 2D plane may be determined e.g. on the basis of the coordinate system used by the load gripping means. The coordinate system may be e.g. a Cartesian coordinate system with axes x and y, enabling the 2D plane to be established as a plane determined by the axes x and y. In such a case, a location point may be determined in the 2D plane by means of values of the coordinate axes (x, y).

Preferably, the distance information comprises information on distances in a direction which is substantially perpendicular to the 2D plane. When the 2D plane is determined by the axes x and y of the Cartesian coordinate system, the distance information may comprise values of an axis z of the same coordinate system.

In the present embodiments, a load is handled by gripping means for attachment to the load. Examples of such gripping means comprise a spreader and/or a hook. The handling of a load may comprise picking up the load, in which case the gripping means are used for attaching to the load and/or stacking the load, in which case the load carried by the gripping means is laid on top of another load.

The present embodiments are suitable for use in the handling of loads, such as containers, e.g. when picking up a container and/or when stacking containers. It is to be noted that the present embodiments may also be applied to handling of other loads having one or more fastening points to enable them to be handled. The fastening points may be provided fixedly in the load, or they may be formed by tie-down straps, such as those used in loads of plank wood bound by tie-down straps.

An embodiment of the invention is based on using Time-of-Flight or ToF cameras. A ToF camera is an example of a three-dimensional (3D) camera. 3D cameras produce distance information associated with a two-dimensional (2D) image and points of a 2D image. The points of the 2D image may be determined as pixels, each pixel being associated not only with a light brightness value (I) but also possibly with colour information (RGB). The 3D camera, such as the ToF camera, attaches a distance (D), measured from the image sensor of the camera to an object visible in an image pixel, to the points of the 2D image. In the following, the operation principle of a ToF camera will be described in sufficiently close detail so as to enable the invention to be understood.

Figure 2:
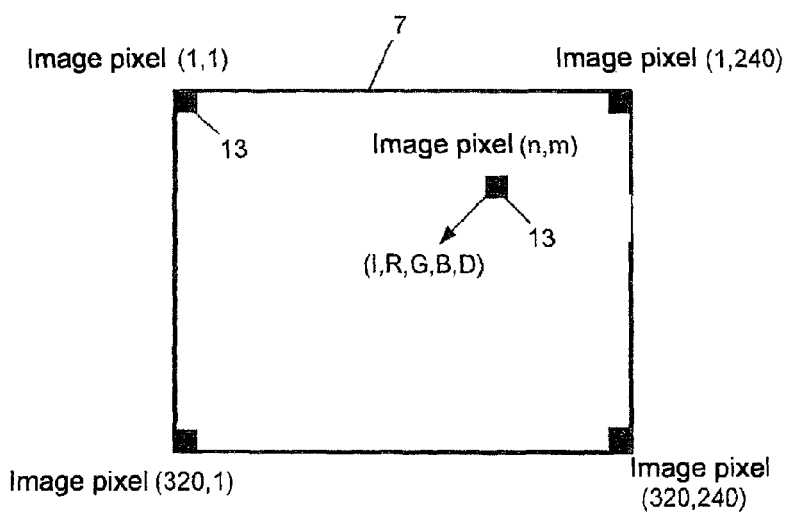
FIG. 2 shows an image sensor of a 3D camera.

A conventional Charge-Coupled Device or CCD camera includes a photosensitive cell manufactured by semiconductor technology and containing photosensitive photodiodes arranged in a regular raster (7), FIG. 2. This raster, e.g. in a modern six-megapixel camera, may at its best have up to e.g. 2816 rows and 2112 columns. One such photosensitive photodiode is called a pixel (13). When such a photodiode is exposed to light, typically led through a lens, the photodiode measures the intensity (I) of radiation of the light it received. A conventional CCD camera thus measures the intensity of light in every pixel (13) of the raster (7).

Typically, no single photosensitive diode sees colours, but it is possible to place colour filters of different colours over the photosensitive diode to enable the CCD camera to also measure the colours of an image. The colour filters are usually red, green, and blue (R, G, B). To sum up, a conventional CCD camera measures the following values for every pixel (13) of the image raster: (I,R,G,B), from which colour information is often omitted as unnecessary, though.

Today, in more and more applications the CCD cells are replaced by Complementary Metal-Oxide Semiconductor or CMOS cells that are similar in their basic operation but the measurement of light intensity, inter alia A/D (analog-digital) conversion, is performed by a cell circuit in itself when, while using CCD cells, it is performed outside the cell circuit.

The Time-of-Flight (ToF) camera differs from the conventional CCD (and CMOS) camera such that when the conventional camera measures light coming from the surroundings, the ToF camera independently produces the light it measures and for this purpose illuminates the object by a light source of its own. In addition to this, the ToF camera measures the time taken by the light produced by it to travel to the object visible in the image and to return, after reflection, to the image sensor of the camera. This measurement of travel time the ToF camera performs separately on every pixel (13) of the image sensor (7) (n, m). In addition to a conventional image, i.e. an intensity map I(n, m) and a possible colour map (R(n,m), G(n,m), B(n,m), the ToF camera thus also produces a distance map (D(n,m) of its image area (7).

In the present embodiments, the measurement of travel time may be implemented e.g. in the ToF camera such that the light to be emitted to the object is modulated by a radio frequency (RF) carrier wave and the phase of the reflected light returned from the object is compared with the phase of the original RF carrier wave, which enables a phase shift between the emitted and reflected light to be determined.

The phase shift may be determined in every image pixel independently. On the basis of the phase shift, it is possible to determine the travel time of light from the camera to the object and back separately for every image pixel. Finally, the distance (D) of the object to each image pixel is calculated utilizing the known propagation speed of light. The ToF camera may carry out the described distance measurement up to 100 times a second. Nowadays, the ToF cameras are capable of measuring distances typically as far as about six meters. It is to be noted that a distance may also be measured in the above-described manner for a group of image points, e.g. by averaging phase shifts of a pixel group or by selecting one pixel in the group of pixels joined together to represent the area formed by the pixel group.

In addition to the distance information D, the ToF camera typically also measures a normal black-and-white or colour camera image. To sum up, the ToF camera measures the following values for every pixel (13) of the image raster (7): (I, R, G, B, D), where D is a 3D distance from the image sensor of the camera to the object visible in the image pixel (13). Often, however, the colour information is omitted as unnecessary.

The current resolution of the ToF cameras is yet relatively moderate, typically e.g. 320 times 240 pixels, but this resolution already enables several technical applications. With typical lens solutions, the site of one pixel corresponds to a size of about 1 mm to 1 cm in the object of measurement. The described ToF camera is particularly suitable for applications for mobile work machines since it does not contain any moving mechanical part and is thus very durable e.g. against impacts directed at the spreader (2).

As is understood by those skilled in the art, the method and apparatus according to the invention may also be implemented by a 3D camera implemented by techniques other than the ToF which produces at a high frequency, e.g. 10 Hz or more, at least the distance information (D) on the image pixels of the object to be recorded and, in some embodiments, at least the intensity and distance information (I, D) on the image pixels of the object to be recorded.

Examples of suitable techniques for implementing a 3D camera comprise inter glia a plenoptic camera and a stereo camera pair. In a plenoptic camera, a special microlens lattice is installed in front of the image sensor. The plenoptic camera enables an image to be focused afterwards to a desired distance, for instance. Similarly, the stereo camera pair may be thought to produce intensity and distance information (I, D). It is to be stated, however, that because of the stereos required, the physical size of the stereo camera pair is large for use in the present invention, and determining the distance information D for every image pixel is more unreliable owing to the limited operational capacity of stereo matching algorithms.

Figure 1:
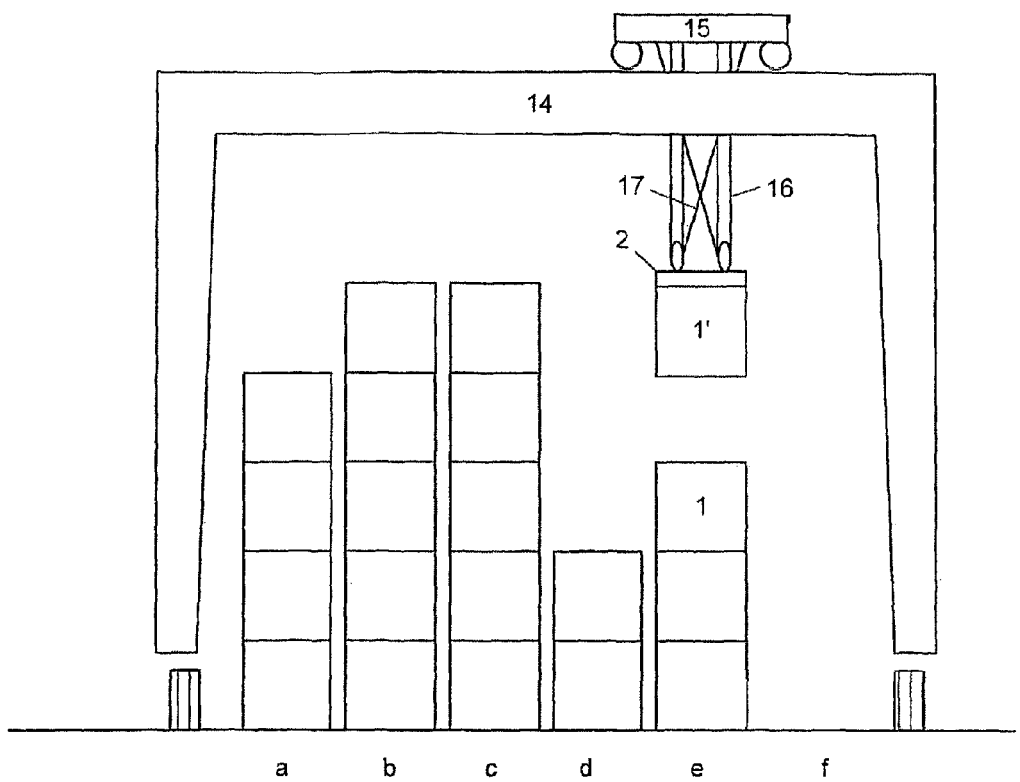
FIG. 1 shows a gantry crane stacking a container on top of a lower container.

FIG. 1 shows a gantry crane (14) stacking a container (1') on top of a lower container (1). Typically, the containers (1) are stored in long rows between the legs of the gantry crane (14). A gap of typically 30 to 50 cm is left between the container stacks. The gantry crane (14) grabs a container by a special spreader (2) hanging from a trolley (15) of the gantry crane, suspended on hoisting ropes (16). By shortening or lengthening the hoisting ropes (16), the container (1') to be carried is lifted and lowered. The container (1') to be carried may be moved in horizontal directions either by moving the trolley (15) or the gantry crane (14) or by means of a special fine transfer mechanism which may be implemented e.g. by means of stay ropes (17). The stay ropes (17) enable the spreader (2) to be provided with lateral forces to move and/or skew the spreader (2).

FIG. 2 shows an image sensor (7) of a 3D camera (3), e.g. a Time-of-Flight (ToF) camera. The image sensor comprises a plurality of pixels (13) which receive light from the object to be recorded. The pixels of the image sensor form an image area of the camera corresponding thereto. In the image sensor, the incoming light received by a pixel is converted into an electric signal. The electric signal may comprise information on the distance to the recorded object, information on the measured light intensity, and colour information (e.g. R, G, B) or a combination of one or more of the aforementioned. Typically, the pixels are arranged on a cell (7) in regular rows and columns. The 3D camera measures for every single pixel (13) typically the following values: light intensity (I) detected by a photodiode corresponding to the pixel, and in some cases also colour components (R, G, B) measured by different colour filters. The 3D camera further measures, based on the travel time of the light emitted by the camera, the 3D distance (D) of the object visible in the image, for every separate image pixel (13) n,m. Thus, in addition to the conventional still and/or video image, the 3D camera also produces a distance map D(n,m) by means of its image sensor (7).

In an embodiment, the image sensor of a 3D camera, such as a ToF camera, is used for forming a distance map. The pixels of the image sensor measure in their location distance information, whereby the pixels (n, m) measured on the image sensor form the distance map. The distance map may be stored in a memory, e.g. in the memory of a computer (20) of FIG. 7. A plurality of distance maps may be formed, and by a plurality of 3D cameras. The distance maps may be stored as still images or as video image.

The location of the containers described in FIGS. 3, 4, 5, 6, 7 is illustrated in an x, y coordinate system where the x axis of the coordinate system is placed in a width direction of a spreader while the y axis is placed in a longitudinal direction of the spreader, enabling the position of a container to be determined as a value of the x axis and as a value of the y axis and by means of rotation of the coordinate system, e.g. as degrees. Further, the location may comprise a vertical position of the container in a direction of a z axis, enabling the rotation to be determined as rotation around the z axis.

Figure 3:
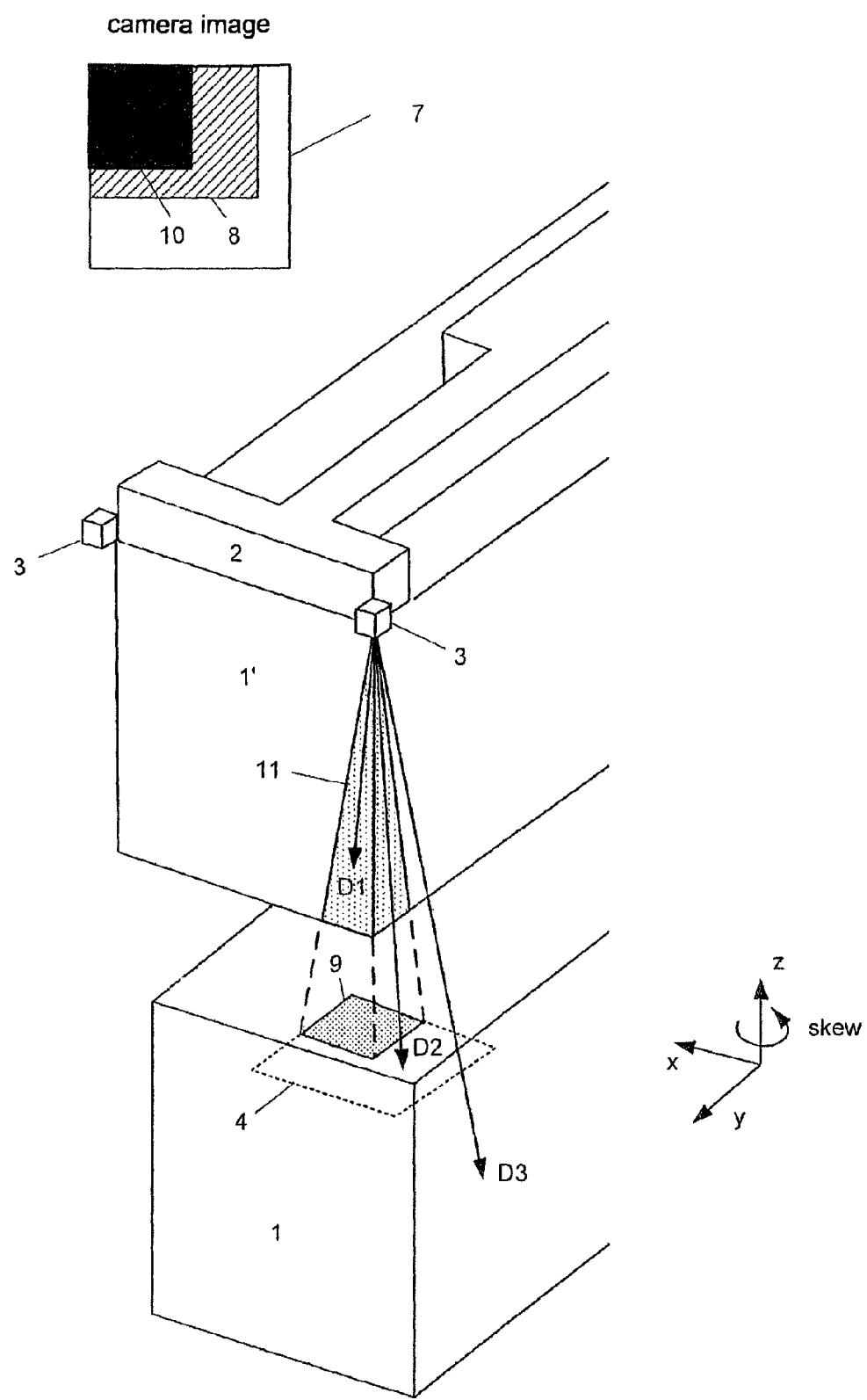
FIG. 3 shows an arrangement according to the invention.

FIG. 3 shows an arrangement according to the invention, wherein 3D cameras (3) are installed in outer corners of a spreader (2). The 3D cameras may be installed in one, two, three or four outer corner(s). A larger number of 3D cameras makes a container more accurate to handle and simpler to control.

The spreader attaches itself to the containers by their corner castings. In such a case, the field of vision of a 3D camera installed in an outer corner of the spreader comprises sides of a container (1') to be carried and a corner of the container, illustrated in a shaded area (11). An area (9, 10) is left beneath the container hanging from the spreader that is unexposed to the 3D camera (3). Thus, the image area of the 3D camera contains no information on objects residing beneath the container to be carried, such as a roof of another container.

In an embodiment, the 3D camera is installed slightly outside an outer circumference of the spreader in both the width (x) and the longitudinal (y) directions. An appropriate installation point is e.g. 5 to 10 cm outside the outer circumference. Preferably, the field of vision of the 3D camera is directed downwards, towards the container to be handled. The installation direction of the 3D camera is thus in a direction from which the containers to be attached to the spreader are received and delivered.

FIG. 3 shows an example of installation of such a camera sensor (3) into the spreader (2), and a distance image (7) seen by the sensor while a container (1') is being stacked on top of another container (1). An image area (4) covered by the sensor then partially matches the container (V) to be carried since the sensor (3) is installed very close to an outer corner of the container (1'). In such a case, a part (10) of the image area of the camera sensor comprises the container (1') to be carried. This image area comprises image points of a side part of the container (1') residing inside a triangular area (11). The camera sensor measures distance values (D1) for image points of the image points falling within the triangular area, which vary between zero and the height of the container. Similarly, an area (9) of the image area (4) remaining in a shadow area beneath the container (1') to be carried is left completely unseen by the sensor (3). The extent of the image area (10) being covered changes according to how high the container (1') to be carried is, as well as slightly according to how the container to be carried has settled to hang on the twist-locks of the spreader. From outside the area (9), from an upper surface (8) of the lower container (1), the sensor (3) measures distance values (D2) indicating the distance of the lower container (1) from the sensor (3), instead. From outer points situated inside the image area (4, 7) which do not meet the lower container (1) but possibly do meet the ground or containers at even lower levels (the area of the image area 7 which is not included in the areas 8 or 10), the sensor (3) measures distance values (D3) that are clearly higher than the distance values (D2). Depending on the mutual position of the upper and the lower containers, the area (8) may be square, have the shape of the letter L, or disappear completely when a corner of the lower container is completely hidden under the upper container. If other containers reside adjacent to the lower container (1), the sensor (3) may obtain distance readings comparable to the distance D2 also from outer edges of the image area (4, 7), but since a gap of about 30 . . . 50 cm is left between the containers to be stacked, these readings obtained outside may be separated from the area (8) and ignored as erroneous.

The lower container (1) possibly falling within the image area (4, 7) of the camera may be partly (8) visible in the camera image from underneath the upper container. In the image area (10) remaining in the shadow area (9), the 3D camera measures distances D1 wherein the pixels of the camera have as their objects the sides of the container to be carried in the area (11). In such a case, the distances D1 measured by the 3D camera in the area (10) remaining in the shadow area are thus limited by the height of the container to be carried, and the distances to be measured are limited to the lower edge of the container to be carried. The distances D1 are thus e.g. over a straight distance shorter than or approximately equal to the height h of the container (1'). Similarly, the 3D camera measures from the image area (8) distances D2 that are greater than the height of the container (1'). These distances are measured from a part of the image area which resides outside (8) the shadow area. The area remaining outside the shadow area may comprise a container and/or other objects remaining underneath the container to be carried.

When the container to be carried is airborne, a border between the shadow area and the area outside the shadow area may be determined e.g. on the basis of changes in the distances measured from the image area. A change may be detected as a change in distance values of two adjacent pixels that is greater than a certain threshold value. When one pixel contains as distance information D(n,m) distance information measured from the side (11) of the container above, the next pixel is within the area outside the shadow area in the image area of the 3D camera and contains a distance value which is by the threshold value greater than the distance value measured from the side of the container. The threshold value may be selected according to desired resolution.

It is also possible to select the threshold value for determining the border between the shadow area and the area outside the shadow area on the basis of the height of the container. The container heights are standardized, enabling the border of a shadow area to be determined by comparing distances measured from a side of a container with the known height of the container.

Further, it is to be noted that the determination of a border may be supported generally by changes in information contained in adjacent pixels in relation to a threshold value. The information contained in the pixels, such as distance, intensity and/or colour information, may be compared with corresponding threshold values that have been set for each of them.

Further, the border between the shadow area and the area remaining outside it may be determined by processing the information measured by the 3D camera for the pixel. The distance information, intensity information and/or colour information on adjacent pixels may e.g. be differentiated and the value of the derivative may be compared with the threshold value of the derivative.

The image area (7) of the 3D camera may comprise a shadow area (10), an area (9) below this shadow area not being included in the field of vision (4) of the 3D camera, and an area (12, 8) outside the shadow area, which may comprise image points of objects surrounding the shadow area, such as surfaces of containers, floor, or the ground.

Referring to FIG. 3, the white area of the image area (7) corresponds to the part of the field of vision (4) of the 3D camera that is outside the shadow area and further outside the shadow area outside the container (1) residing in the field of vision of the 3D camera. From this area, the 3D camera measures distances D3 which are greater than the distances D2 and, further, greater than the distances D1 that are measured from the container (1') to be carried and forming the shadow area.

Figure 4:
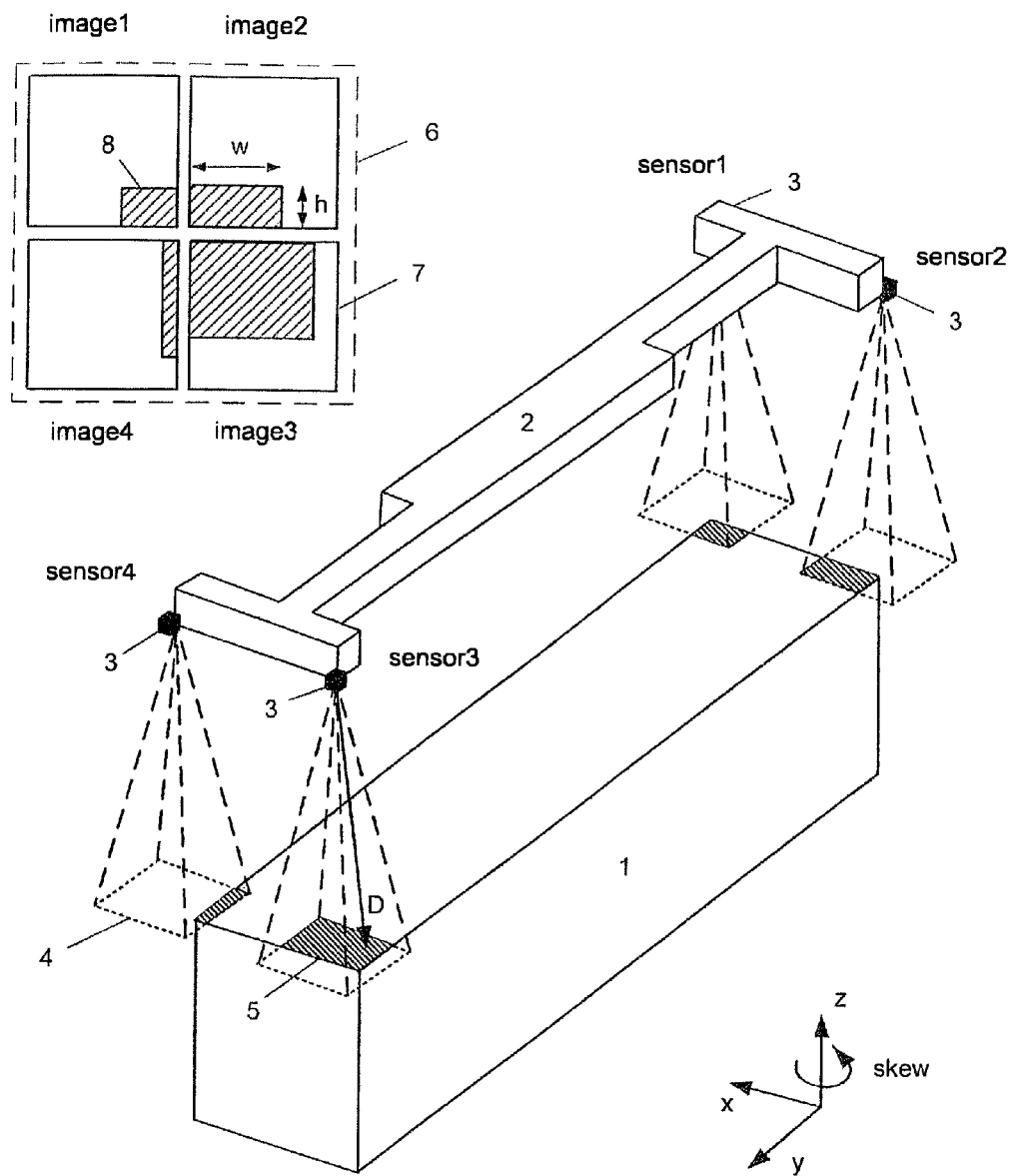
FIG. 4 shows an arrangement according to the invention and its operation while a load is being picked up.
Figure 5:
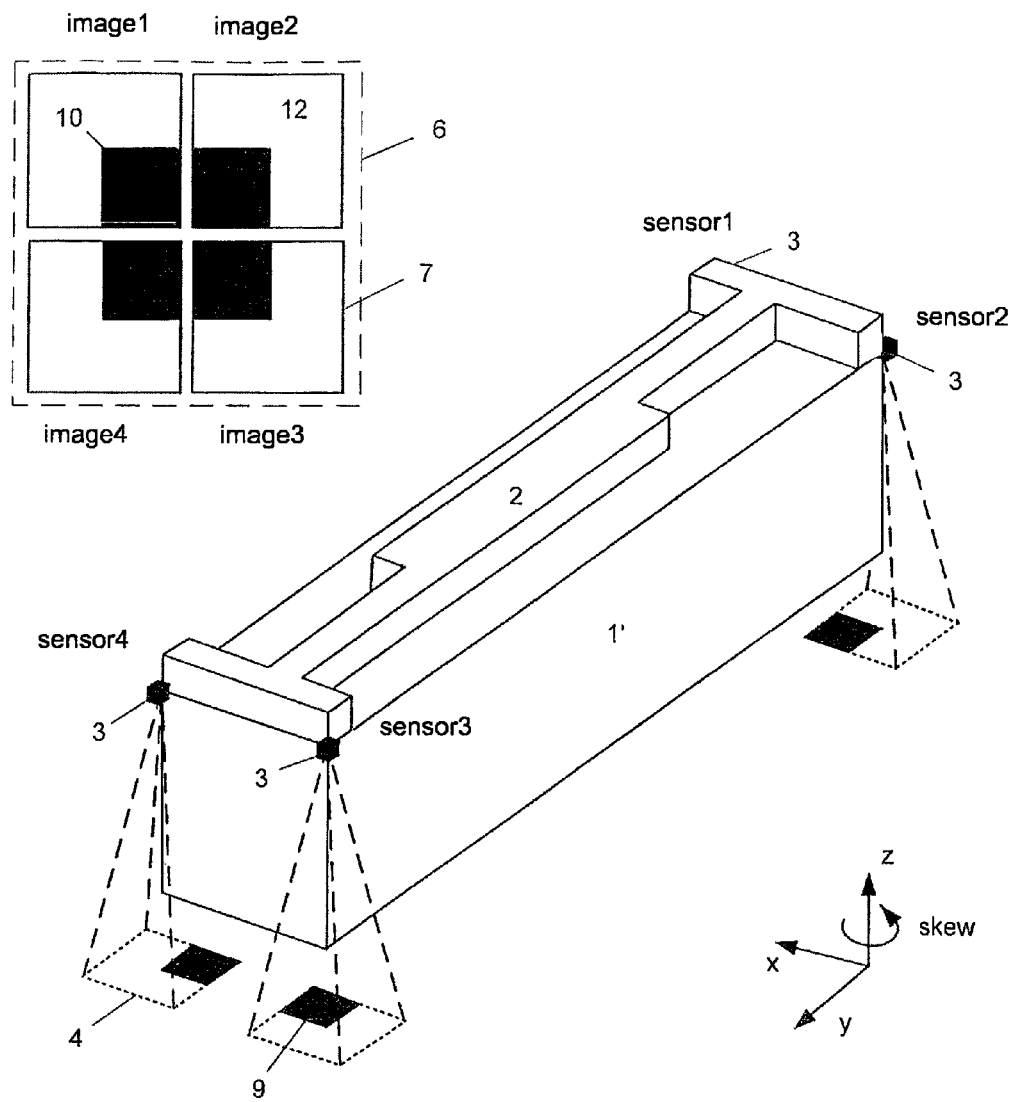
FIG. 5 shows an arrangement according to the invention and its operation once the load is attached to a gripper.
Figure 6:
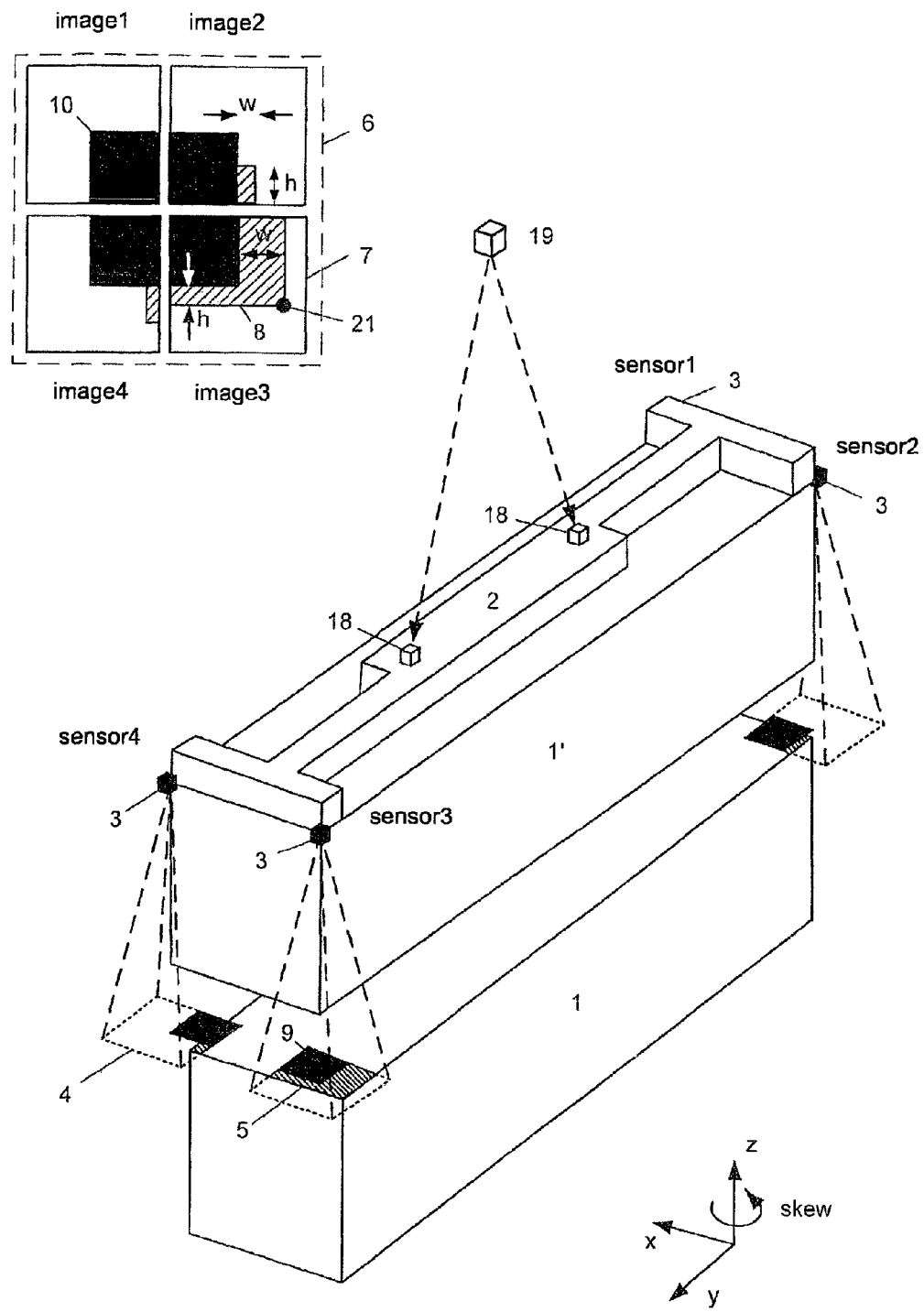
FIG. 6 shows an arrangement according to the invention and its operation while the load is being stacked.

In FIGS. 4, 5, 6, a load comprises a container (1, 1') being handled by a spreader (2). FIG. 4 shows an arrangement according to the invention and its operation while the load is being picked up. FIG. 5 shows an arrangement according to the invention and its operation once the load is attached to the spreader, and FIG. 6 shows an arrangement according to the invention and its operation while the load is being stacked.

In FIGS. 4, 5, and 6, the outer corners of the spreader (2) are provided with 3D cameras (3). The field of vision (4) of each camera is illustrated in an image area (4). The image areas of the 3D cameras form a set (6). In the set, parts of the distance maps formed by the image areas which comprise loads to be handled are separated from one another and from their surroundings. The set of images forms a composition in which the parts of the distance maps that comprise the load to be handled are placed in the middle while the parts of the distance maps that reside outside the parts presenting the load to be handled are placed at edges of the composition.

A set is formed when the 3D cameras (3) see the corners of the container (1, 1') as far as a part (5, 11) falling in the field of vision (4) of the camera is concerned. The parts of a container unattached to the spreader falling within the field of vision of the 3D camera are shown in the image area (7) of the camera as shaded areas (8). The 3D cameras measure distances (D) to objects (5, 11) within the field of vision of the 3D camera. The measured distances are shown in the image area (7) of each 3D camera as areas (8, 10) corresponding to the objects (5, 11) in the field of vision.

The composition enables a driver of a container handling device to clearly see the position of the corners of the container in relation to one another also e.g. in difficult lighting conditions in the dark gaps formed by the container stacks. The driver may e.g. be shown a conventional intensity image of a camera having e.g. the areas (image pixels) of the image fields wherein the containers to be handled are located (8, 10) coloured by using different colours. The coloured parts of the image fields could be partially transparent, such that the conventional intensity image of a camera is visible from below the colouring, or the coloured parts (8, 10) of the image field are completely non-transparent. The relative size and detectability of areas that are essential to the driver, e.g. (8), may also be graphically increased by a computer (20) such that it is easier for the driver to detect even small deviations in location e.g. between an upper and a lower container. The ToF camera is particularly suitable for implementing the described function since one and the same camera sensor (3) produces both the normal camera image (i.e. the intensity map I(n,m)) and the distance map (D(n,m). Preferably, the 3D cameras are installed in the spreader such that the image shown by them of each corner of the container once the container is attached to the spreader is symmetrical with the images of the other cameras. This facilitates the operation particularly when a driver-assisting function is concerned, making it easy for the driver to detect a symmetrical situation. Symmetry may be achieved e.g. when the area (8) of the container in the image area of the 3D camera is of the same shape and size in all 3D cameras of the spreader. Different forms of symmetry are for instance mathematical reflection of a pattern with respect to a straight line, as well as reflection or rotation of a pattern with respect to a point. Such a configuration may be achieved by installing each 3D camera in the same place in relation to an outer corner of the spreader to which the 3D camera is fastened and, where necessary, by scaling the images of the 3D cameras. The symmetry of the image areas of the 3D cameras once the container is attached to the spreader and the composition formed from the image areas of the multiple 3D cameras enable the spreader to be controlled when the container is being picked up. While picking up the container, the spreader may thus be controlled towards the mutually symmetrical image areas of the 3D cameras.

In an embodiment, from the images of the 3D cameras a set (6) is formed in which the parts of the image areas of the 3D cameras that comprise the container to be picked up are placed in the middle, while the parts of the image areas that reside outside the parts presenting the container to be picked up and handled are placed at the edges of the composition. It is possible in the composition to leave some space between the image areas of different 3D cameras, in which case a grid formed by the image areas forms a lattice which separates the images from one another. It is to be noted that no such lattice is necessary but the images may also be presented in the composition with no spaces therebetween. The composition enables the image areas presenting the container to be picked up to be mutually compared and the spreader to be controlled so that mutually symmetrical image areas are formed. In a driver-assisting function in particular, it is easy for the driver to detect the correct alignment of the spreader on the basis of the symmetry.

Further, when using automatic control, where instead of a driver the spreader is controlled e.g. by a computer (20), the symmetry of the images enables resources necessary for processing image signals of the 3D cameras and complexity of the algorithms to be kept at a low level, because the processing of the image signals may be focused on a certain part of the image area of the 3D camera and, further, in the middle of the composition.

In FIGS. 5 and 6, the container to be handled has been fastened to the spreader, in which case in the shown compositions (6), instead of the above-described container to be picked up, in the middle of the composition are now visible the parts of the image areas that comprise the container (10) fastened to the spreader, while the parts of the image areas that reside outside the parts presenting the fastened container are located at the edges of the composition.

From the objects in the field of vision of the 3D camera, e.g. a container (1) to be picked up, a container (1') to be carried, and/or a container (1) beneath the container to be carried, areas (10, 8) corresponding to the objects are formed in the image area of the 3D camera. Different areas may be identified e.g. on the basis of the distance (D) measured by the 3D cameras (3).

In an embodiment, e.g. while picking up a container, as shown in FIG. 4, when the spreader (2) is being lowered towards the container (1), the image pixels (8) from the image area of the 3D camera whose measured distance (D) is smaller than a predetermined limit value, e.g. 1 m, are identified. As explained above, measurements coming from containers possibly located next to the container (1), such as containers in adjacent container rows, may be ignored as erroneous on the basis of the gap (30 to 50 cm) between the containers. Next, the driver of the container handling machine may be shown a grid (6) formed e.g. by four real-time camera images (7) wherein e.g. are coloured (8) the areas (image pixels) of the image area wherein the detected object (=container to be picked) is closer than a certain distance. As is understood by a person skilled in the art, distance readings coming from around the container to be picked up and e.g. from the ground are considerably higher owing to the height of the container (1) to be picked up. When the corners (8) of the container visible in the grid (6) form a symmetrical pattern, the spreader (2) is in the correct position with respect to the container (1) to be picked up.

The method works equally well both when handling 20 feet containers and when handling 40 feet containers, because when the spreader is lengthened or shortened according to the container to be handled to the correct measure, the 3D cameras are in the same location with respect to the container. When considering the process of picking up containers exclusively, the number of 3D cameras may be reduced to two, since it will suffice to control the spreader in place with respect to two corners of the container: the remaining two corners are then automatically located in their correct place. In order for the driver to be able to utilize the symmetry of the images in the controlling process, the most advantageous position for the 3D cameras would be in diagonal corners of the spreader. In an embodiment, e.g. while picking up a container, such as in FIG. 4, it is possible on the basis of image pixels (8) identified in the image field (7) to calculate numerical values of lateral displacement (x, y) and skew of the spreader with respect to the container to be picked up. This may be carried out e.g. by determining by a computer (20) the width (w) and height (h) of the square part (8) as image pixels. When such numerical values are constantly determined, preferably at a frequency of at least 10 Hz, it is possible by the computer control (20) to control the spreader (2) into the correct location and thus to implement the automatic control of the lateral displacement (x, y) and skew of the spreader. A great advantage of the method is that the same sensor system may be used both for completely automatic unmanned operation and also for assisting the driver.

In an embodiment, the distance map is utilized in controlling the spreader when handling one or more containers. Examples of container handling comprise picking up a container and stacking a container to be carried on top of a container located therebelow. The control may be implemented automatically, in which case the spreader may be controlled in an unmanned manner, e.g. by a computer (20) provided in the container handling device, or by remote control.

The controlling of a container may comprise e.g. controlling a container (1') to be carried to reside on top of another container by means of the spreader and/or picking up a container (1) by the spreader. The spreader may be moved in a selected coordinate system, e.g. in the coordinate system of a container handling device (14, 15), such as a crane. When the spreader is moved without a load to be carried, the load to be handled (e.g. a container to be picked up) moves in a distance map. When the spreader carries a load, the load to be handled (i.e. a container to be carried) stays substantially immobile in the distance map. When the spreader is being controlled, corresponding distance maps are formed by one or more 3D cameras attached thereto.

The spreader is moved in the image plane of the 3D camera, in a depth direction with respect to the image plane, or in a combination thereof. When a plurality of distance maps is formed, preferably the image planes of the 3D cameras are parallel with one another. However, owing to the swaying of the spreader, the movement of the spreader may be detected in a different manner in each distance map.

In an embodiment, a distance map is determined in the coordinate system of the gripping means. In such a case, the distances are measured with respect to the gripping means, and the axes of the coordinate system to be used are fixed to the gripping means. Distance information provided by the distance map thus formed may be converted for a new coordinate system having different axes than those of the coordinate system of the gripping means. This may be advantageous when e.g. only one or two 3D camera(s) is/are used in the spreader, in which case no image on the distance map is obtained of all corners of the container. The gripping means may be controlled in the new coordinate system by using the distance information measured with the distance maps on the container to be handled and/or the container therebelow. It is to be noted that it is not necessary for the distance maps of all 3D cameras to have a simultaneous detection of a container to be handled when the information provided by the distance maps is converted for the new coordinate system. The distance information provided by distance map obtained by one 3D camera may be converted for a new coordinate system, in which case the location of an area (8, 10) detected in the distance map is known in the new coordinate system. When on the distance map of another 3D camera a load (10) to be handled or an object (8) outside the load to be handled is detected, the distance information provided by the other distance map may be converted for a new coordinate system. When two 3D cameras are used, the cameras may be installed in the outer corners of the spreader, as explained above. Preferably, the corners are diagonal or opposite to one another in a longitudinal direction of the spreader. The longitudinal direction of the spreader may be determined to be a direction according to the length direction of the container. Consequently, by using two 3D cameras, it is possible to determine the locations of the corners of the container and control the spreader to pick up or stack the containers, for instance.

Similarly, when a container to be carried is airborne and off the containers situated therebelow, the area of the container to be carried may be identified when the distance is below a lower limit set therefor. As described above, the lower limit may comprise a threshold value being limited on the basis of the height of the container to be carried. Further, when the threshold value is exceed, objects situated below the container to be carried, such as other containers or another container, may be identified.

FIG. 5 shows an arrangement according to the invention and the operation thereof once a load (1') is fastened to gripping means (2). In the example of FIG. 5, the load is a container (1') and the gripping means is a spreader (2), as is common when containers are handled. The outer corners of the spreader are provided with 3D cameras. The field of vision (4) of the 3D cameras includes an area (10) corresponding to the shadow area (9), wherein the distances measured by the 3D camera are limited on the basis of the height of the container. Distances to be measured from the shadow area are thus measured from the surface of the container to be carried, e.g. from its sides (11). The container to be carried prevents the 3D camera from seeing the area (9) situated below the container. The 3D camera forms an image area (7) in which the shadow area (10) may be separated from free areas (12) of the field of vision of the 3D camera outside the shadow area. The shadow area and the other areas of the image area may be identified as explained above.

The arrangement of FIG. 5 enables the area of the container to be carried to be determined in the distance map once the load is fastened to the gripping means. This area forms a shadow area within which the distances measured by the 3D camera are limited on the basis of the height of the container. Consequently, the location of the container to be carried may be determined in the image areas of the 3D cameras, enabling, when handling the container, e.g. when stacking it on top of another container, the container to be moved utilizing the determined shadow area. Preferably, the shadow areas are determined such that only the container to be carried is in the field of vision of the 3D camera, at the same height range, as in FIG. 5. In an example, the 3D camera is set to detect objects residing at a distance of 3 m or less. For such a 3D camera, the shadow areas may be determined by lifting the container high enough for the distance of the 3D camera to containers other than the container to be carried to be more than 3 m. The shadow area thus determined (e.g. a group of image pixels) may now be stored e.g. in the memory of a computer (20) in order to enable, e.g. when stacking containers, only the free area (12) of the field of vision to be searched for a lower container.

In an embodiment, the container to be carried is controlled so that in a certain height range of the image area of each 3D camera an area (10) only corresponding to the determined shadow area (9) is visible. If in the image area, in a certain height range, objects other than the shadow area are visible, the movement may be stopped. The movement is stopped particularly when the distance (D) of an object detected in the image area is smaller than the height of the container, in which case moving the container in the plane of the image area could cause a collision with the detected object.

In another example, the shadow area determined for the 3D camera may be used for controlling a container to be carried while stacking containers. In such a case, the container (1') to be carried is controlled to reside on top of another container and to be lowered onto it. When stacking the containers, it is essential that while approaching the lower container (1) the distance readings (D1) to be measured from the upper container and the distance readings (D2) obtained from the lower container can be separated from one another. When the container (1') to be stacked and the lower container (1) approach one another, the difference between these distance readings is reduced to zero, so the task is demanding. When a shadow area (10) has been determined in the image area of the 3D camera, and this shadow area (10) has been stored e.g. in the memory of a computer (20), it is possible while determining the location of the lower container (1) to monitor only the area (12) outside the shadow area, without having to worry about the container to be carried being confused with the lower container.

In an embodiment of the invention, the determined shadow area (10) is utilized for picking up the container at a later date. The shadow area (10) may be determined and stored e.g. in the memory of the computer (20) when the container (1) is being placed in a container stack. When the container (1) is then again to be picked up later, the stored distance map (10) may be utilized while controlling the spreader (2) into the correct location in order to pick up the container (1). This enables the distance map measured by a sensor (3) to be compared in real-time with the stored distance map (10) and these distance maps to be controlled, either by the driver or automatically controlled by the computer (20), to be congruent. The method may be applied by using a minimum of only one 3D camera (3) when not only the location (21) of a corner visible in the map but also the directions of the sides of the container visible in the map are determined from the distance map in order to compare the skew of the container (1) with respect to the stored distance map (10).

The stacking of containers is shown in connection with FIG. 6. FIG. 6 shows an arrangement according to the invention and its operation while stacking a load (1'). In the example of FIG. 6, the load is a container and the gripping means is a spreader (2), as is common when conventional containers are handled. 3D cameras are installed in the outer corners of the spreader. The installation may be carried out as described above. The 3D cameras (3) then possibly see the corners (5) of a lower container (1) if and when they are not covered by the shadow (9) caused by an upper container (1'). The area (8) of the image area corresponding to the lower container (1) may be identified e.g. on the basis of the distance (D) measured by the 3D camera, as described above. In an example, the area of the lower container may be identified when e.g. the measured distance D is below a set lower limit, which in this case is higher than the height of the container (1') to be carried.

In such a case, in the controlling of the container the shadow area (10) may be ignored and the container may be controlled by mutual relationships of the areas (8) corresponding to the lower containers and/or the relationship of the area (8) corresponding to the lower container to the shadow area. The relationship of the areas may be formed by comparing the areas with one another, e.g. by comparing their location, size and/or one or more dimensions in the image area of the 3D camera. Thus, when stacking the containers, the container to be carried may be controlled so that the areas (8) are symmetrical and that the shadow area (10) as well as possible covers the area (8) corresponding to the lower container. In such a case, the area corresponding to the lower container eventually almost disappears in the shadow area when the containers are aligned with one another. As described above, the relative size of the areas (8) may also be artificially increased graphically by a computer (20) such that it is easier for the driver to detect even small deviations in location between the upper and the lower container.

The method works equally well both when handling 20 feet containers and when handling 40 feet containers, because when the spreader is lengthened or shortened according to the container to be handled to the correct measure, the 3D cameras are in the same location with respect to the container.

In an embodiment, it is possible on the basis of the identified areas (8) to also calculate numerical values of lateral displacement (x, y) and skew of the upper container with respect to the lower container. This may be carried out e.g. by determining by the computer (20) the width (w) and height (h) of the arms of the square or L-letter-shaped part (8) as image pixels. When such numerical values are constantly determined, preferably at a frequency of at least 10 Hz, it is possible by the computer control (20) to control the spreader (2) into the correct location and thus to implement the automatic control of the lateral displacement (x, y) and skew of the spreader when stacking the containers. A great advantage of the method is that the same sensor system may be used both for completely automatic unmanned operation and also for assisting the driver.

In an embodiment, when stacking the containers, the skew between a lower container and a container to be carried is determined on the basis of the area corresponding to the lower container, detected by the 3D camera, and the shadow area. The skew may be determined by measuring an angle between the sides of the shadow area and the area corresponding to the lower container. On the basis of the determined angle, the container to be carried may be controlled towards a zero angle between the areas, the skew then being zero. In such a case, the areas are mutually symmetrical.

FIG. 6 further shows an additional sensor system (18, 19) according to an embodiment of the invention, enabling another coordinate system to be used in load handling so as to control the spreader, in addition to the coordinate system of the 3D cameras. By using more than one coordinate system, particularly when stacking the containers, the number of 3D cameras to be installed in the spreader may be reduced, e.g. from four 3D cameras installed in every outer corner of the spreaders to two. The different coordinate systems may be formed by using, in addition to 3D cameras, additional sensors that operate in a coordinate system different from that of the 3D cameras. For instance, the coordinate systems of the additional sensor system and the 3D cameras may have different axes. The different axes may be implemented by selecting different starting points, origins, for each coordinate system.

In FIG. 6, the additional sensor system is implemented by a measuring device (18, 19) which measures the x, y location and the skew of the spreader (2) with respect to the trolley (15). Consequently, the spreader serves as the starting points of the coordinate systems of the 3D cameras, whereas the starting point of the coordinate system of the measuring device implementing the additional sensor system is set e.g. in a fastening place of the measuring device, which may be the trolley (15). The measuring device may be implemented e.g. by two infrared (IR) light sources (18) installed' in the spreader, the locations thereof being determined by a camera (19) installed in the trolley (15). Owing to the measuring device, the number of 3D cameras (3) may be reduced, particularly while stacking the containers, from four to two, since when two 3D cameras (3) see two corners of the lower container (1), the location information on the lower container and the skew thereof may now be determined in the coordinate system of the trolley (15), stored in the memory of the computer (20), and the upper container may be lowered on top of the lower container by means of the sensor system (18, 19) and the stored location of the lower container. In addition, it is not necessary to see the two corners of the lower container (1) simultaneously.

Figure 7:
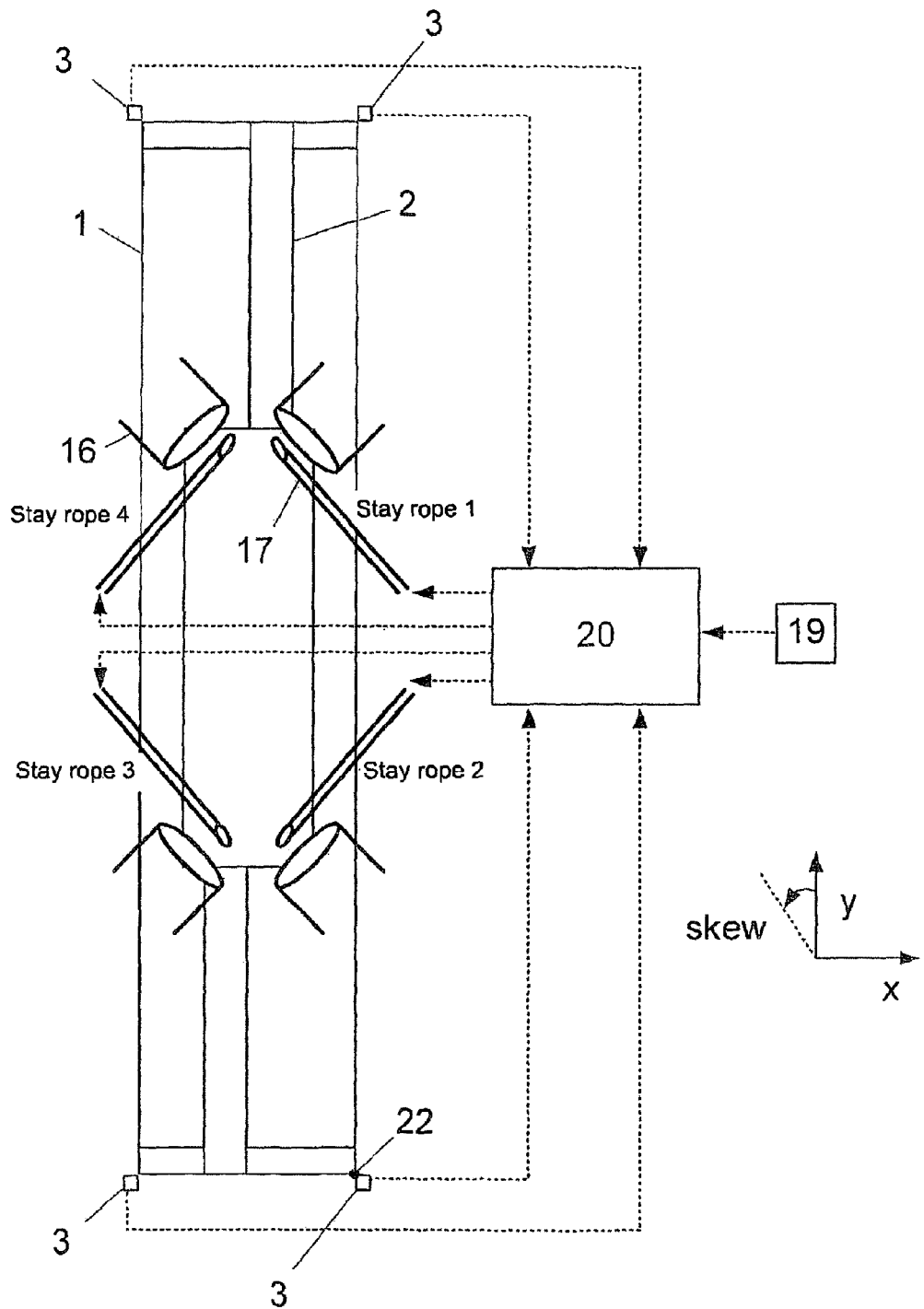
FIG. 7 shows a way to implement automatic control of a spreader (2) on the basis of areas of distance maps.

FIG. 7 shows a way to implement control of a spreader (2) on the basis of the areas of distance maps. It is possible to fasten to the spreader a fine transfer mechanism comprising one or more 3D cameras (3) and stay ropes (17). The fine transfer mechanism shown in FIG. 4 comprises four stay ropes (stay rope1, stay rope2, stay rope3, stay rope4) and 3D cameras (3) installed in the outer corners of the spreader (2). The 3D cameras (3) may be installed as described above. On the basis of distance maps formed by the 3D cameras (3), the stay ropes (17) are controlled to move the container (1) to be carried.

In the implementation of the fine transfer of FIG. 7, separate stay ropes (17) are installed in four corners of the middle part of the spreader (2), next to pulleys of the hoisting ropes (16). Upper ends of the stay ropes are attached to the trolley (15), from which forces applied thereto may be controlled e.g. by electric motors. If the spreader (2) is now to be moved in direction x, the forces of stay ropes 1 and 2 are increased while simultaneously the forces of stay ropes 3 and 4 are decreased. If the spreader (2) is to be moved in direction y, the forces of the stay ropes 2 and 3 are increased while simultaneously the forces of the stay ropes 1 and 4 are decreased. If the spreader (2) is to be skewed, i.e. if the skew of the coordinate system of the spreader is to be controlled in a counterclockwise direction, the forces of the stay ropes 2 and 4 are increased while simultaneously the forces of the stay ropes 1 and 3 are decreased. According to FIG. 7, the stay ropes (17) may be controlled automatically by the computer (20) e.g. in one or more manners described in the embodiments described above. The computer may be connected to one or more 3D cameras (3) to receive measurement data, e.g. electric and/or optical measurement signals. The computer may further be connected to the additional sensor system (18, 19) which measures the displacement between the coordinate systems.

FIG. 8 shows a method of stacking a load, according to an embodiment. The method is now explained using an example in which a container is handled by a spreader and referring simultaneously to the embodiments shown in FIGS. 1 to 7 by using the reference numbers of FIGS. 1 to 7. The spreader may further be a part of a container handling device, such as a gantry crane.

The method starts 802 once the container is fastened to the spreader. This situation is shown in FIG. 5. Then, one or more 3D cameras are installed in the spreader to form corresponding distance maps. The shadow area of the distance maps of the 3D cameras is determined in step 804. The distance maps may be determined for each 3D camera separately or at the same time. In the following, the operation will be explained with respect to one distance map. The determination of the distance map may comprise identifying an area covered by a container to be carried. In this area, the distances of the image points of the distance map are limited on the basis of the height of the container to be carried, e.g. slightly greater than the height of the container to be carried.

Consequently, the visibility of objects (9) residing below the container within this area (10) is blocked, the area thus forming a shadow area (10).

In an embodiment, the shadow area is determined when the container has been lifted in the air, preferably to a height at which the distance between the container to be carried and the objects therebelow is greater than a set detection distance of the 3D camera. Hence, areas (12) outside the shadow area of the 3D camera are empty, and the shadow area is simple to determine.

In an embodiment, the shadow area is determined according to features of the container to be carried. The features of the container to be carried may be determined as predetermined features when e.g. the size, such as the height, of the container to be handled is known. In such a case, the shadow area may be determined on the distance map as an area formed by points of the map whose distances are limited to the height of the container to be handled. Consequently, the area remaining outside the shadow area may be determined as an area formed by map points of the distance map whose distances exceed the height of the container to be handled.

The container to be carried is stacked 806 on top of another container (1). This can be carried out as illustrated in FIG. 6. Preferably, while stacking the container (1'), only the part of the distance map outside the shadow area is monitored. Since the shadow area remains substantially unchanged while the container is being carried, by focusing the monitoring of the lower container (1) on the area outside the shadow area, the risk of confusing monitoring results with the container (1') to be carried may be avoided, enabling the calculation power available for processing the information produced by the distance maps to be used for monitoring the changing part of the map.

The method ends 808, and the container is now ready to be stacked. After the containers have been stacked, the spreader may be detached, and the process moves on to handling the next container, e.g. picking up a container, whereby the method may start anew.

FIG. 9 shows a method of handling a load when the load is controlled on the basis of a distance map measured in a coordinate system of a crane (14, 15) and in a coordinate system of a spreader, according to an embodiment. The method is now explained using an example in which a container is handled by a spreader and referring simultaneously to the embodiments shown in FIGS. 1 to 7 by using the reference numbers of FIGS. 1 to 7. The spreader may further be a part of a container handling device, such as a gantry crane. An advantage of using the additional sensor system (18, 19) is that the number of 3D cameras necessary in the spreader for monitoring the containers to be handled may be reduced, particularly when the containers are being stacked. The method comprises picking up a container and/or stacking the picked-up container on top of another container by using two 3D cameras installed in the longitudinal direction on different sides of the spreader, e.g. in longitudinally or diagonally opposite outer corners of the spreader, and an additional sensor system to determine the location of the spreader, as is shown in FIG. 6.

The method starts 902 when the spreader (2) determines distance maps by 3D cameras. In steps 904 and 906, the 3D cameras (3) of the spreader detect corners (21) of a container situated below the spreader. The detections may occur separately or simultaneously. Information contained in the location points of the distance map is converted by means of the additional sensor system (18, 19) for another coordinate system, e.g. a coordinate system of a crane (14, 15), and stored. Thus, the locations of the detected corners (21) of the container below are provided in the coordinate system of the crane, which makes the location of the container below the spreader available while controlling the spreader.

The spreader and/or the spreader and the container carried by it may be controlled 908 to move into the locations of the corners of the container below in the coordinate system of the crane. When the additional sensor system (18, 19) is used, the horizontal coordinates (x, y) of any selected point of the spreader (2) may be determined with respect to the crane (14, 15). It is possible for instance to determine the locations of the sensors (3) or the locations (22) of the corners of the container (1') to be carried, or an outer corner (22) of the spreader, which typically corresponds to the location of the corner of the container to be carried. The method ends 910 when the spreader has been controlled to reside on top of the container below, enabling the container to be picked up, and/or the container to be carried has been controlled to reside on top of the container below, enabling the containers to be stacked.

When the additional sensor system (18, 19) is used, the horizontal coordinates (x, y) of a point of the distance map of the spreader (2) may be determined 904, 906 with respect to the crane (14, 15). In such a case, e.g. when stacking the containers, the location (21) of a corner detected by the sensor (3) of the lower container (1) (x_corner, y_corner) is converted for the coordinate system of the crane (14, 15) (x_corner_lower container; y_corner_lower container) e.g. by the following formula:

$$x\_corner\_lower\ container = x\_sensor + \cos(skew)\ x\_corner + \sin(skew)\ y\_corner \quad (1)$$

$$y\_corner\_upper\ container = y\_sensor + \cos(skew)\ y\_corner - \sin(skew)\ x\_corner,$$

where (x_sensor, y_sensor) are the horizontal location of the sensor (3) determined by the measuring devices (18, 19) in relation to the crane (14, 15) while (skew) is the skew of the spreader (2) determined by the measuring devices (18, 19) in relation to the crane (14, 15).

The coordinates (x_corner_lower container, y_corner_lower container) are stored in the memory (20) of the computer. After the coordinates of at least two separate corners have been stored in the memory of the computer (20), the upper container (1') may subsequently be aligned 908 on top of the lower container (1). The lateral location of the spreader (2) may be intentionally controlled by the computer (20) such that it is ensured that any desired two corners of the lower container (1) are detected. In other words, the computer control is to ensure that the desired two corners of the lower container (1) are not continuously covered by the upper container (1'). The alignment may be carried out such that the upper container (1) is e.g. by the computer control (20) controlled to reside at said at least two corners of the container (1'):

$$x\_corner\_spr \rightarrow x\_corner\_lower\ container$$

$$y\_corner\_spr \rightarrow y\_corner\_lower\ container \quad (2)$$

where (x_corner_spr, y_corner_spr) are the horizontal location of the corner (22) of the container (1') to be carried, determined by the measuring devices (18, 19) in relation to the crane (14, 15), while (skew) is the skew of the spreader (2) determined by the measuring devices (18, 19) in relation to the crane (14, 15). In such a case, the corner of the spreader (and the upper container) resides exactly on top of the lower container. Alternatively, while picking up the container, (x_corner_spr, y_corner_spr) are the horizontal location of an outer corner (22) of the spreader, determined by the measuring devices (18, 19) in relation to the crane (14, 15).

FIG. 10 shows a device for implementing the arrangements of the present embodiments. The device 1000 of FIG. 10 comprises a processing unit 1008, a memory 1010, and connecting means 1002. The connecting means 1002 for connecting one or more sensors, e.g. a 3D camera, to the device. The connecting means may comprise a data reception unit 1004 and a data transmission unit 1006. Via the data reception unit, information may be received from the 3D camera, e.g. image pixels measured by the 3D camera. Via the data transmission unit, a distance map or maps determined in the device may be forwarded, for instance to a device responsible for controlling a crane or gripping means.

All units are electrically connected to each other. The memory may contain one or more programs that are executable by the processing unit. The processing unit may operate controlled by program instructions stored in memory and determine a distance map on the basis of information received from the 3D camera.

In an embodiment, the device 1000 may employ the determined distance maps for controlling the crane and/or its gripping means. In such a case, the device 1000 may be e.g. a control unit of a load handling device, such as a crane, which is connected to sensors, such as one or more 3D cameras and/or additional sensors.

In an embodiment, the device 1000 may forward the distance maps determined by it to a device responsible for controlling the gripping means, such as to a control unit of a load handling device, such as a crane. The device is then easy to implement, and it may be installed together with one or more sensors, e.g. 3D cameras and/or additional sensors, in cranes already in use. This enables already existing cranes to be updated for implementing the present embodiments.

In an embodiment, the connecting means comprise a display. The display enables the operation of one or more load handling devices to be monitored. One or more distance maps, e.g. a set (6) formed from distance maps, may be shown on the display. The display, e.g. a Liquid Crystal Display (LCD), may serve as a transmission unit of a connection unit, in which case the display is used for transmitting an image signal in order to display distance maps e.g. to a driver, a person remote-controlling load handling devices or to a person monitoring automated load handling. The display may further serve both as a transmission unit and reception unit of the connection unit, in which case in addition to what has been described above, it is possible to receive information and/or instructions, e.g. instructions for controlling a load handling device and/or image processing instructions for modifying, such as zooming in and out, a set of distance maps. Such a display may comprise a touch screen, for instance. The processing unit may control the display in accordance with the instructions and/or commands stored in memory to implement functions described above.

The processing unit may contain a set of registers, an arithmetic logic unit, and a control unit. The control unit is controlled by a sequence of program instructions that are transferred to the processing unit from the memory. The control unit may contain numerous microinstructions for basic functions. Implementation of the microinstructions may vary depending on the configuration of the processing unit. The program instructions may be encoded in a programming language, which may be a high-level programming language, such as C, Java, etc., or a low-level programming language, such as a machine language or assembler. The memory may be a volatile memory or non-volatile memory, such as EEPROM, ROM, PROM, RAM, DRAM, SRAM, firmware, programmable logic, etc.

The computer program may be in source code format, object code format or in some intermediate format, and it may be stored on a transfer medium that may be any entity or device capable of storing the program. Such transfer media include a storage medium, computer memory, read-only memory, electric carrier wave, data communications signal and software distribution package, for instance.

The device and parts thereof 1000 may be implemented as one or more integrated circuits, such as an Application Specific Integrated Circuit or ASIC. Other implementations are also possible, such as a circuit made of separate logic components. A hybrid of these different implementation alternatives is also feasible. An example of circuits made of logic components is a Field Programmable Gate Array or FPGA circuit.

In an embodiment, the load handling device, e.g. a crane, such as a container hoist, e.g. a gantry crane or a straddle carrier, is updated, whereby in the crane, in the gripping means, a distance map may be determined within the area of which are described a part of the area of the load to which the gripping means attach and/or on which another load is stacked, as well as surroundings of the load. The update may be implemented by providing the gripping means with one or more 3D cameras, as described above. On the other hand, if a smaller number of 3D cameras is to be used; 3D cameras and additional sensors may be installed in the load handling device, as shown FIG. 6. In addition to installing the aforementioned devices; the update may further comprise a software update. The software may comprise e.g. computer software which may be stored in the memory of the load handling device, enabling it to be executed while handling the load. It is also possible that the update only comprises software installation if the load handling device is already provided with means for producing a distance map.

The present invention is applicable to any load handling device, hoist device, crane, container hoist, gantry crane, straddle carrier, Overhead crane, quay crane or to any combination of different devices provided with gripping means for fastening to a load.

The devices, such as load handling devices, hoist devices, cranes, container hoists, gantry cranes, straddle carriers, overhead cranes, quay cranes, implementing the functionality of the device, according to the above-described embodiments comprise not only prior art means but also means for determining a distance map in the gripping means, the area of the distance map describing a part of the area of the load to which the gripping means attach and/or on top of which another load is stacked, and the surroundings of the load.

More specifically, they may comprise means for implementing the functionality of the device described in the embodiment described above, and they may comprise separate means for each separate function, or the means may be arranged to perform two or more functions. Known devices comprise processors and memory that may be utilized for the one or more functionalities described in the embodiments described above.

It is apparent to a person skilled in the art that the devices shown in the embodiments described above may also contain parts other than those described above which are irrelevant to the invention and which, for the sake of clarity of the disclosure, have thus been omitted therefrom.

It will be apparent to a person skilled in the art that as technology advances, the basic idea of the invention may be implemented in many different ways. The invention and its embodiments are thus not restricted to the examples described above but may vary within the scope of the claims.

The invention claimed is:

1. A method of handling a load by a load handling device comprising a gripper for gripping at least one fastening point of the load, the method comprising:
   determining, in the gripper, a plurality of distance maps each of which includes a plurality of points associated with distance information, and includes an area within which a part of the area of the load to which the gripper attach and/or on which another load is stacked, as well as surroundings of the load, are described, the plurality of distance maps describing different areas of loads within which fastening points or stacking points are located;
   forming a set of distance maps, wherein parts of the distance maps comprising loads to be handled are separated from one another and from the surroundings of the loads; and
   controlling the gripper on the basis of shapes of areas of the distance maps determined by the loads.

2. The method as claimed in claim 1, comprising:
   determining a first area of a load to be handled in the distance map once the load is fastened to the gripper;
   determining a second area of the load to be handled in the distance map once the load is off the gripper;
   determining a difference between the first area and the second area; and
   controlling the gripper on the basis of the difference.

3. The method as claimed in claim 1, comprising:
   determining a first area of the load to be handled in the distance map once the load is fastened to the gripper;
   determining a second load area in the distance map;
   determining a difference between the load areas in the distance map;
   controlling the gripper on the basis of the difference between the load areas.

4. The method as claimed in claim 1, wherein the method comprises determining the distance map in a coordinate system of the gripper; and
   converting distance map distance information for a new coordinate system having axes different from those of the coordinate system of the gripper; and
   controlling the gripper in the new coordinate system.

5. The method as claimed in claim 1, wherein the controlling of the gripper comprises moving the gripper against a distance of the distance map in a perpendicular plane or in a depth direction in a direction of a distance of the distance map, or in a combination thereof.

6. The method as claimed in claim 1, wherein the step of controlling the gripper comprises:
   controlling the gripper on the basis of symmetry of the distance maps.

7. The method as claimed in claim 1, wherein the method comprises the load handling device picking up the load and/or stacking the load on top of another load.

8. The method as claimed in claim 1, wherein the method comprises the gripper being controlled to a load fastening point and/or for stacking the load on top of another load.

9. The method as claimed in claim 1, wherein the method comprises determining the distance map in a plane in a direction of which the load is controlled, the distance map comprising distances in a direction perpendicular to said plane.

10. The method as claimed in claim 1, wherein the distance map comprises an image area containing image points including one or more of distance information, light intensity information, and colour information.

11. The method as claimed in claim 1, wherein the method comprises fastening the load to the gripper, and the distance map comprises an image area including a part of the fastened load.

12. The method as claimed in claim 1, wherein the gripper comprises a spreader, including one or more twist-locks, for attaching to a corner casting of a container.

13. The method as claimed in claim 1, wherein the load comprises a container, the distance map determining locations of a container placed in a container stack or a container to be carried, or both, with respect to the gripper.

14. The method as claimed in claim 1, wherein the gripper comprises a spreader and a sensor measuring a distance map provided in at least one outer corner of the spreader.

15. The method as claimed in claim 1, wherein the method comprises entering the distance map on a computer for picking up and/or stacking the load automatically, controlled by the computer.

16. The method as claimed in claim 1, wherein the method comprises positioning non-simultaneously at least two areas of the load to be handled, and storing the positions of the areas in order to determine the location and skew of the load.

17. The method as claimed in claim 1, wherein the method comprises determining the distance map in a field of vision comprising a corner of a container to be carried, the corner comprising a fastening point for the gripper.

18. The method as claimed in claim 1, wherein the load handling device comprises a crane.

19. The method as claimed in claim 1, wherein the gripper comprises a spreader and a sensor measuring a distance map provided in two longitudinally opposite outer corners of the spreader, in two diagonally opposite outer corners of the spreader, or in all outer corners of the spreader.

20. The method as claimed in claim 1, wherein the method comprises:
   fastening the load to the gripper; and
   determining a part of the distance map covered by the load while the load is uplifted, to be separate from other loads, and stored in a memory of a computer.

21. The method as claimed in claim 20, wherein the method comprises fastening the load to the gripper, and ignoring the stored part covered by the load in the distance map while monitoring other loads.

22. The method as claimed in claim 1, wherein the method comprises showing the distance map to a driver of the load handling device in order to assist the driver for picking up and/or stacking the load.

23. The method as claimed in claim 22, wherein the method comprises modifying the distance map by image processing in order to better assist the driver in picking up and/or stacking the load.

24. The method as claimed in claim 1, wherein the method comprises using a 3D camera for determining the distance map.

25. The method as claimed in claim 24, wherein the 3D camera is a Time-of-Flight camera.

26. An arrangement comprising:
   means for handling a load by a load handling device comprising gripping means for gripping at least one fastening point of the load, and
   means for determining, in the gripping means, a distance map that includes a plurality of points associated with distance information, and includes an area within which a part of the area of the load to which the gripping means attach and/or on which another load is stacked, as well as surroundings of the load, are described.

27. A computer program product comprising a non-transitory machine-readable storage medium having program instructions to instruct a load handling device comprising a gripper for gripping at least one fastening point of a load, to perform a method comprising:

determining, in the gripper, a plurality of distance maps each of which includes a plurality of points associated with distance information, and includes an area within which a part of the area of the load to which the gripper attach and/or on which another load is stacked, as well as surroundings of the load, are described, the plurality of distance maps describing different areas of loads within which fastening points or stacking points are located;

forming a set of distance maps, wherein parts of the distance maps comprising loads to be handled are separated from one another and from the surroundings of the loads; and controlling the gripper on the basis of shapes of areas of the distance maps determined by the loads.

28. A method of updating a load handling device, comprising:

installing on the load handling device:

an arrangement comprising:

means for handling a load by the load handling device comprising gripping means for gripping at least one fastening point of the load, and means for determining, in the gripping means, a distance map that includes a plurality of points associated with distance information, and includes an area within which a part of the area of the load to which the gripping means attach and/or on which another load is stacked, as well as surroundings of the load; or a computer program product comprising a non-transitory machine-readable storage medium having program instructions to instruct the load handling device to perform a method comprising:

determining, in the gripping means, a plurality of distance maps each of which includes a plurality of points associated with distance information, and includes an area within which a part of the area of the load to which the gripper attach and/or on which another load is stacked, as well as surroundings of the load, are described, the plurality of distance maps describing different areas of loads within which fastening points or stacking points are located;

forming a set of distance maps, wherein parts of the distance maps comprising loads to be handled are separated from one another and from the surroundings of the loads; and controlling the gripping means on the basis of shapes of areas of the distance maps determined by the loads.

* * * * *